United States Patent
Inui et al.

(10) Patent No.: US 7,298,405 B2
(45) Date of Patent: Nov. 20, 2007

(54) IMAGE SENSING APPARATUS HAVING PHOTOELECTRIC CONVERSION ELEMENTS AND A SCANNING CIRCUIT

(75) Inventors: Fumihiro Inui, Kanagawa (JP); Tetsuya Itano, Kanagawa (JP); Masanori Ogura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 911 days.

(21) Appl. No.: 10/360,449

(22) Filed: Feb. 7, 2003

(65) Prior Publication Data

US 2004/0080647 A1 Apr. 29, 2004

(30) Foreign Application Priority Data

Feb. 7, 2002 (JP) .............................. 2002-030916

(51) Int. Cl.
*H04N 3/14* (2006.01)
(52) U.S. Cl. ..................................... 348/304
(58) Field of Classification Search ................. 348/303, 348/304
See application file for complete search history.

(56) References Cited

U.S. PATENT DOCUMENTS 6,559,889 B2 *   5/2003   Tanaka et al. ............... 348/299
2002/0067416 A1 *   6/2002   Yoneda et al. ............... 348/304

FOREIGN PATENT DOCUMENTS

JP   2-69081   3/1990
JP   4-277985   10/1992
JP   5-137071   6/1993
JP   7-46483   2/1995

* cited by examiner

*Primary Examiner*—Lin Ye
*Assistant Examiner*—Dillon Durnford-Geszvain
(74) *Attorney, Agent, or Firm*—Morgan & Finnegan LLP

(57) ABSTRACT

An image sensing apparatus which reduces noise generated by shift operation and power consumption is disclosed. The shift register of a horizontal scanning circuit is divided into a plurality of partial shift registers. Shift clock control circuits control supply of a shift clock to the partial shift registers individually for each partial shift register.

9 Claims, 8 Drawing Sheets

FIG. 1

PRIOR ART

IMAGE SENSING APPARATUS HAVING PHOTOELECTRIC CONVERSION ELEMENTS AND A SCANNING CIRCUIT

FIELD OF THE INVENTION

The present invention relates to an image sensing apparatus, camera, and information processing apparatus and, more particularly, to an image sensing apparatus having a scanning circuit for sequentially selecting a plurality of lines of a sensor array in which a plurality of photoelectric conversion elements are arrayed, and a camera and information processing apparatus which incorporate the image sensing apparatus.

BACKGROUND OF THE INVENTION

Solid-state image sensing apparatuses are roughly classified into CCD sensors and MOS sensors. The CCD sensor generally has a small-noise advantage but requires high power consumption. The MOS sensor is much lower in power consumption than the CCD sensor, but generally suffers large noise. However, the MOS sensor tends to reduce noise, and is expected to attain performance equal to or higher than that of the CCD sensor in the future.

Figure 1:
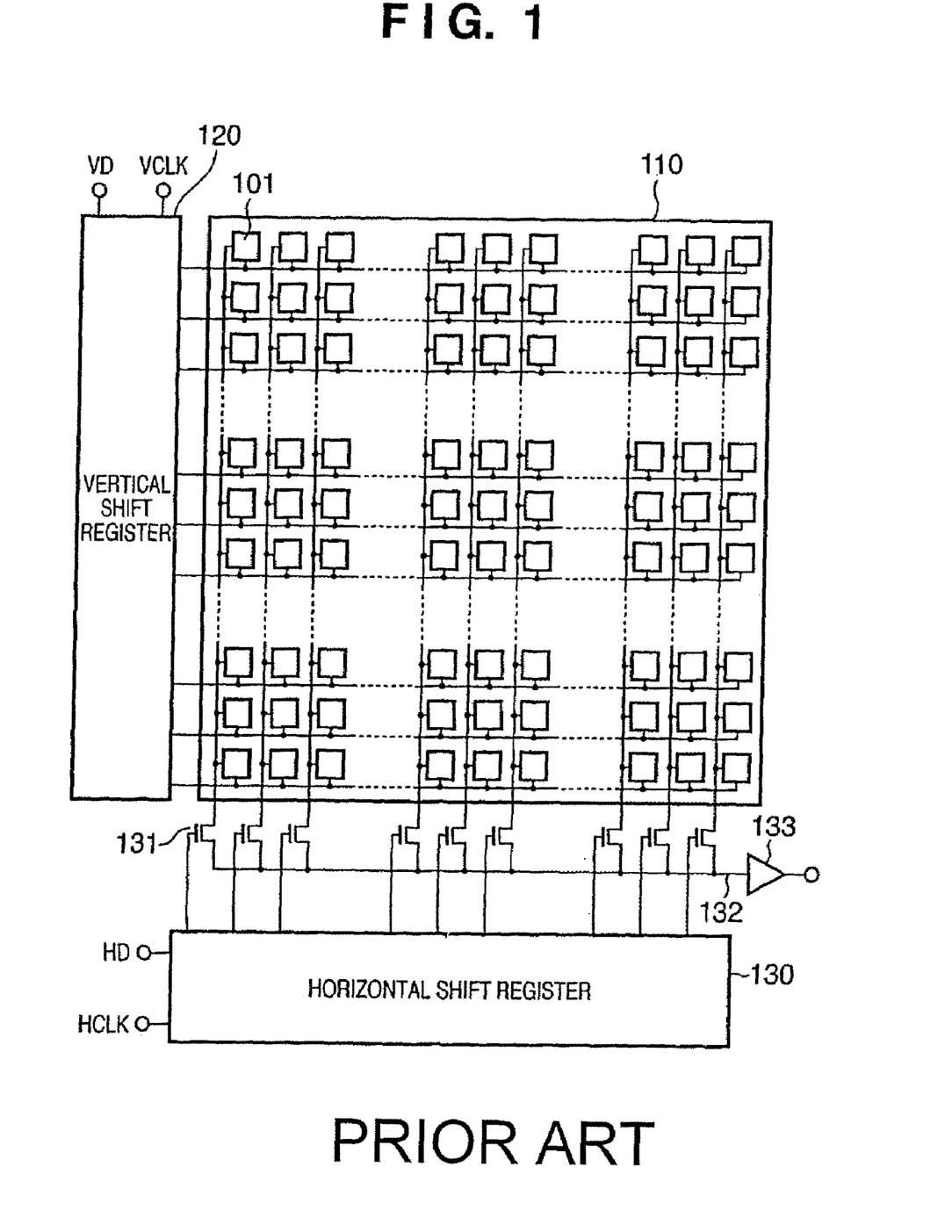
FIG. 1 is a block diagram showing the arrangement of a conventional image sensing apparatus.

FIG. 1 is a block diagram showing the schematic arrangement of a conventional MOS sensor. The MOS sensor comprises a sensor array 110 in which many photoelectric conversion elements 101 are two-dimensionally arrayed, a vertical shift register 120 for sequentially selecting (activating) the rows of the sensor array 110, a horizontal shift register 130 for sequentially selecting (activating) vertical transfer switches 131 to sequentially connect the vertical signal lines of the sensor array 110 to a common output line 132, and an amplifier 133 for amplifying a signal which appears on the common output line 132.

In the conventional MOS sensor shown in FIG. 1, the horizontal shift register 130 is constituted by series-connecting many registers. Shift data HD input to a register on the first stage is sequentially shifted to the final stage in accordance with a horizontal shift clock HCLK. The output of each register is connected to the gate of a corresponding vertical transfer switch 131. A plurality of switches 131 are sequentially activated one by one in accordance with the shift of shift data. The vertical shift register 120 operates almost similarly to the horizontal shift register 130 though the cycle of a vertical shift clock VCLK is different from that of the horizontal shift clock.

In the conventional MOS sensor shown in FIG. 1, noise on the power supply line is large along with the operations of the shift registers 120 and 130. This problem becomes serious particularly in the horizontal shift register 130 which performs shift operation at a high speed. The noise problem in the conventional MOS sensor will be explained by exemplifying the horizontal shift register 130.

In the conventional MOS sensor, the shift clock HCLK is supplied to all the registers which constitute the horizontal shift register 130 when signals of respective rows are to be successively read out via the common signal line 132, i.e., when the horizontal shift register 130 is to be operated. In the arrangement shown in FIG. 1, the shift clock HCLK is supplied to all the registers which constitute the horizontal shift register 130. Every time the potential level of the shift clock HCLK changes (i.e., at each HCLK edge), a large current flows through the shift clock line, inducing noise on the power supply line or the like.

In the above shift clock supply method, all the registers which constitute the shift register 130 are simultaneously driven, and power consumption by these registers becomes very large.

This problem also occurs not only in an area sensor in which photoelectric conversion elements are two-dimensionally arrayed, but also in a line sensor in which photoelectric conversion elements are arrayed in a line.

SUMMARY OF THE INVENTION

The present invention has been made in consideration of the above situation, and has as its object to reduce, e.g., noise in an image sensing apparatus and/or power consumption of the image sensing apparatus.

According to one aspect of the present invention, there is provided an image sensing apparatus having a scanning circuit for scanning a sensor array in which a plurality of photoelectric conversion elements are arrayed, wherein the scanning circuit comprises a shift register constituted by series-connecting a plurality of partial shift registers which shift shift data in response to a shift clock, and a control circuit which controls supply of the shift clock to the plurality of partial shift registers individually for each partial shift register.

According to a preferred aspect of the present invention, the control circuit preferably operates the shift register while changing, of the plurality of partial shift registers, a partial shift register to which the shift clock is supplied.

According to another preferred aspect of the present invention, the control circuit preferably operates the shift register while changing, of the plurality of partial shift registers, a partial shift register to which the shift clock is supplied, so as to shift the shift data from a first stage to final stage of the shift register.

According to still another preferred aspect of the present invention, it is preferable that each of the plurality of partial shift registers comprise a plurality of series-connected registers, and the control circuit start supply of the shift clock to a next partial shift register at an arbitrary timing before a timing at which the shift data is transferred from one partial shift register to the next partial shift register. The control circuit preferably stops supply of the shift clock to one partial shift register at an arbitrary timing after the shift data is transferred from one partial shift register to the next partial shift register.

According to still another preferred aspect of the present invention, the control circuit preferably controls supply of the shift clock to the plurality of partial shift registers so as to suppress, to not more than two, the number of partial shift registers to which the shift clock is simultaneously supplied.

According to still another preferred aspect of the present invention, the control circuit preferably controls supply of the shift clock to the plurality of partial shift registers so as to suppress, to one, the number of partial shift registers to which the shift clock is simultaneously supplied.

The shift register may include a horizontal shift register or vertical shift register.

According to another aspect of the present invention, there is provided a camera or information processing apparatus, comprising the above-described image sensing apparatus, and a processor which processes an image sensed by the image sensing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described below with reference to the accompanying drawings.

First Embodiment

Figure 2:
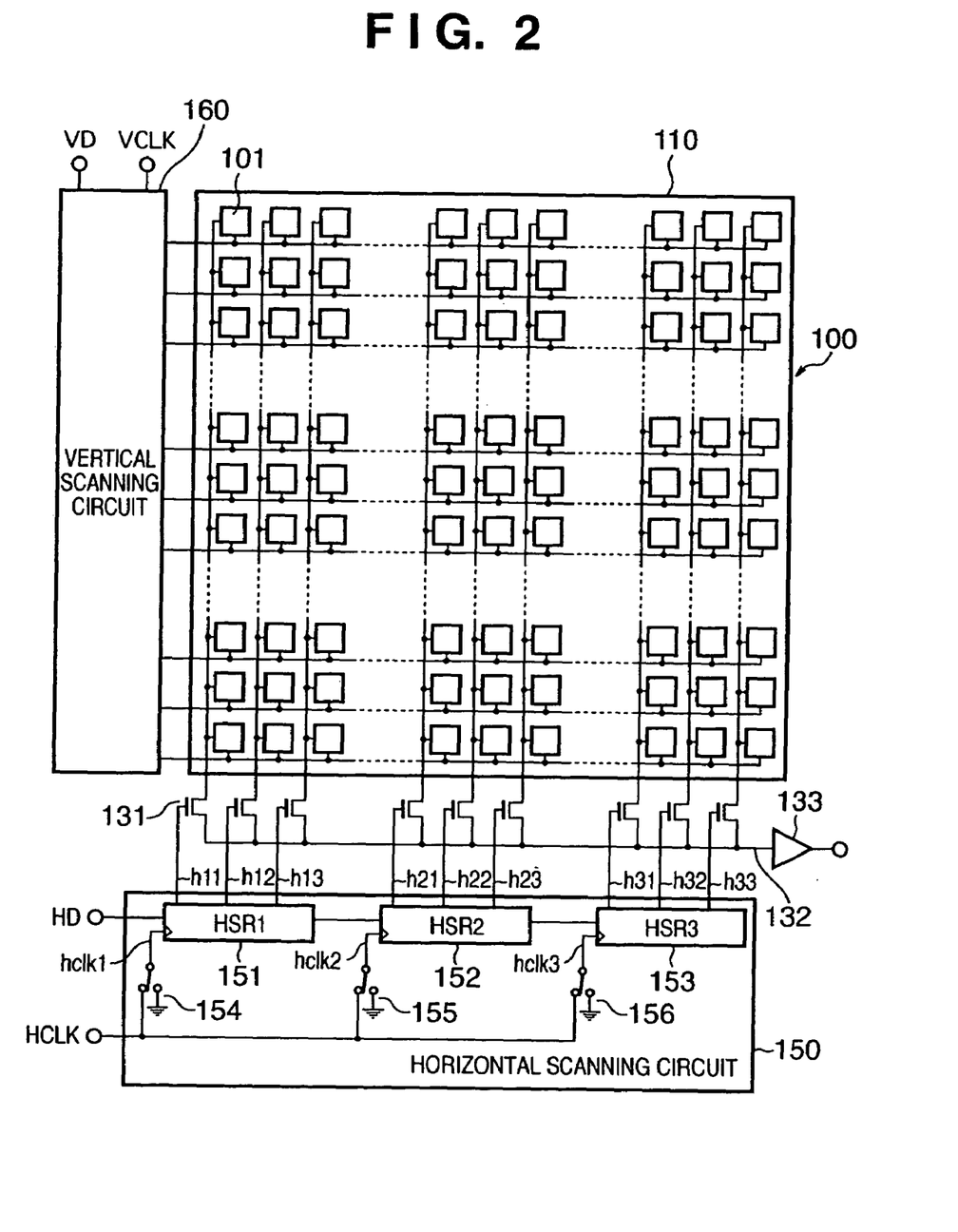
FIG. 2 is a block diagram showing the arrangement of an image sensing apparatus according to a preferred embodiment of the present invention.

FIG. 2 is a block diagram showing the schematic arrangement of a MOS sensor as a solid-state image sensing apparatus according to the first embodiment of the present invention. A MOS sensor 100 shown in FIG. 2 comprises a sensor array 110 in which many photoelectric conversion elements 101 are two-dimensionally arrayed, a vertical scanning circuit 160 for sequentially selecting (activating) a plurality of rows of the sensor array 110 one by one, a horizontal scanning circuit 150 for sequentially selecting (activating) a plurality of vertical transfer switches 131 one by one to sequentially connect a plurality of vertical signal lines of the sensor array 110 to a common output line 132 one by one, and an amplifier 133 for amplifying a signal which appears on the common output line 132.

According to the present invention, it is preferable to divide a shift register which constitutes the horizontal scanning circuit 150 into a plurality of partial shift registers, and control supply of a horizontal shift clock HCLK to the plurality of partial shift registers individually every block register. This can decrease the number of simultaneously driven registers, compared to a conventional image sensing apparatus which supplies a horizontal shift clock to all the registers that constitute the horizontal shift register. That is, the shift register to which the shift clock is supplied is divided into a plurality of blocks, and the shift clock is simultaneously supplied to only some of these blocks. Noise generated on the power supply line or the like upon driving a register can be reduced. Also, power consumption can be reduced by reducing a load (the number of registers to be simultaneously driven) on the shift clock supply line.

The number of blocks to which the shift clock is simultaneously supplied is preferably two or less, and more preferably one in order to maintain noise generated on the power supply line or the like at a predetermined level and/or further reduce power consumption.

In the preferred embodiment of the present invention shown in FIG. 2, the shift register of the horizontal scanning circuit 150 is divided into three partial shift registers 151, 152, and 153. Supply of the horizontal shift clock HCLK to the three partial shift registers 151, 152, and 153 is individually controlled by shift clock control circuits 154, 155, and 156. The shift clock control circuits 154, 155, and 156 can be constituted by, e.g., multiplexers each of which receives the shift clock HCLK at one input and is set to the ground potential at the other input.

Figure 3:
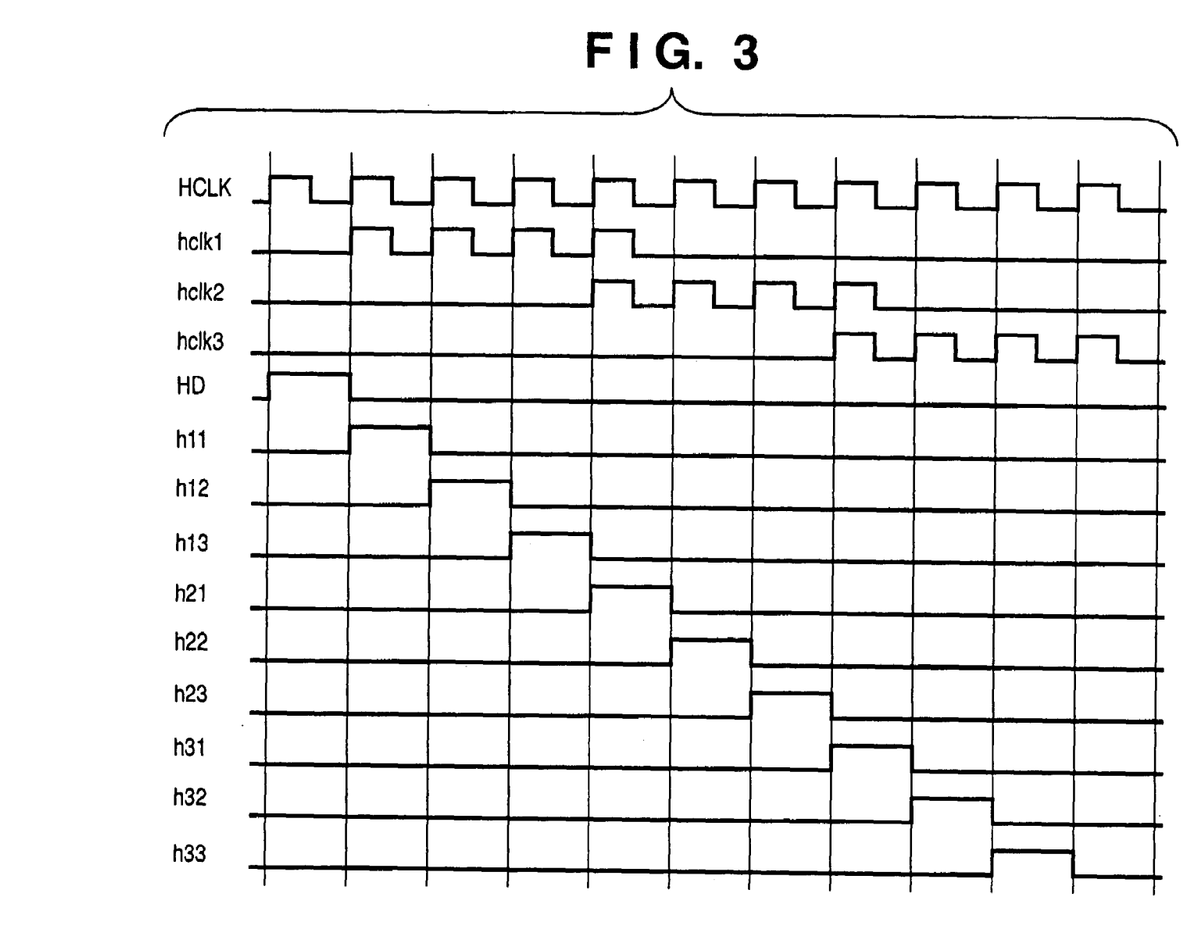
FIG. 3 is a timing chart showing the operation of a horizontal scanning circuit shown in FIG. 2.

FIG. 3 is a timing chart showing typical signals concerning the horizontal scanning circuit 150 of the MOS image sensor 100 shown in FIG. 2. In FIG. 3, the total number of vertical signal lines of the MOS sensor 100 shown in FIG. 2 is nine for illustrative convenience, and each of the partial shift registers 151, 152, and 153 is assigned to three vertical signal lines.

The first partial shift register 151 is formed from, e.g., three registers (e.g., D flip-flops), and sequentially activates column selection signals $h_{11}$, $h_{12}$, and $h_{13}$ while shifting pulse-like shift data HD in accordance with a first shift clock hclk1. The output of the register on the final stage is cleared (i.e., raw data is received) in synchronism with the final leading edge of the first shift clock hclk1. The first shift clock hclk1 is a signal generated by the shift clock control circuit 154 on the basis of the shift clock HCLK. For example, when the shift clock control circuit 154 is formed from a multiplexer, the switching signal of the multiplexer is so controlled as to output a signal identical to the shift clock HCLK during the generation period of hclk1.

The second partial shift register 152 has the same arrangement as that of the first partial shift register 151. The second partial shift register 152 receives an output pulse (shift data) from the first partial shift register 151, and sequentially activates column selection signals $h_{21}$, $h_{22}$, and $h_{23}$ while shifting the pulse in accordance with a second shift clock hclk2.

The third partial shift register 153 has the same arrangement as that of the first partial shift register 151. The third partial shift register 153 receives an output pulse (shift data) from the second partial shift register 152, and sequentially activates column selection signals $h_{31}$, $h_{32}$, and $h_{33}$ while shifting the pulse in accordance with a third shift clock hclk3.

In the example shown in FIG. 3, the final pulse of the first shift clock hclk1 and the first pulse of the second shift clock hclk2 are respectively supplied to the first partial shift register 151 and second partial shift register 152 at the same timing. It is also possible to form the final-stage register of each partial shift register from a register with a reset terminal and after activating the final column selection signals $h_{13}$, $h_{23}$, and $h_{33}$, supply a reset signal to the reset terminal, resetting the register on the final stage. In this case, shift clocks can be supplied to the partial shift registers 151 to 153 at exclusive timings (i.e., the shift clock is supplied to only one partial shift register at one timing). The number of registers to which the shift clock is supplied can always be kept constant in a series of shift registers constituted by the first to third partial shift registers 151 to 153. As a result, the noise level which may be induced on the power supply line or the like due to the shift clock can be suppressed almost constant, realizing stabler signal read. This arrangement minimizes the number of registers to which the shift clock is supplied, further suppressing power consumption.

Only an arrangement of the horizontal scanning circuit 150 has been described, but the vertical scanning circuit 160 can also adopt the same arrangement. It is also possible that the horizontal scanning circuit 150 takes the same arrangement as the conventional one, and only the vertical scanning circuit 160 is constituted in accordance with the above-described arrangement of the horizontal scanning circuit 150.

Second Embodiment

Figure 4:
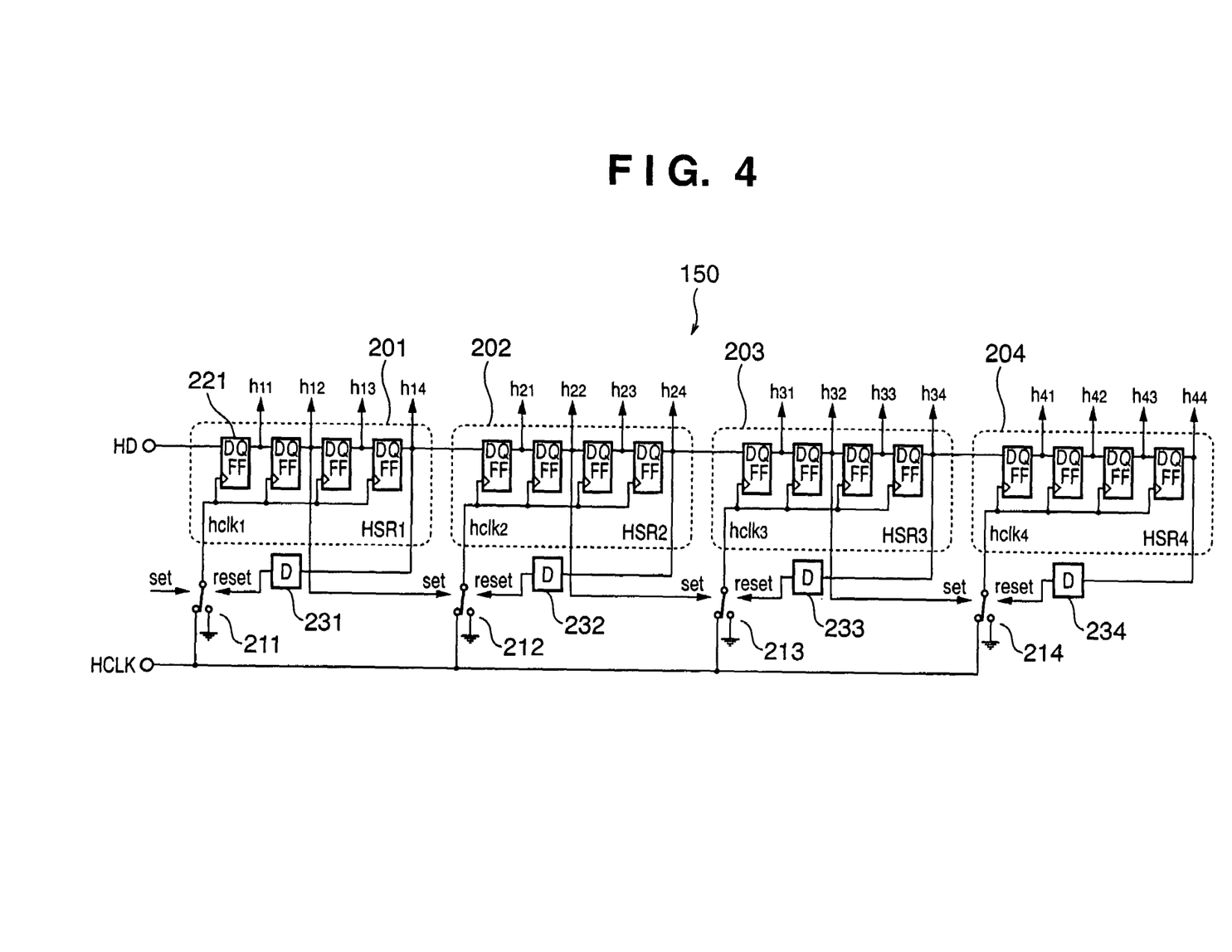
FIG. 4 is a circuit diagram showing an arrangement of a horizontal scanning circuit according to the second embodiment of the present invention.

The second embodiment provides another arrangement of a horizontal scanning circuit 150 in a MOS sensor 100 shown in FIG. 2. FIG. 4 is a circuit diagram showing the arrangement of the horizontal scanning circuit 150 according to the second embodiment of the present invention. In the arrangement shown in FIG. 4, the horizontal scanning circuit 150 is divided into four partial shift registers 201, 202, 203, and 204. In the arrangement shown in FIG. 4, the total number of vertical signal lines of the MOS sensor 100 shown in FIG. 2 is 16 for illustrative convenience, and each of the partial shift registers 201, 202, 203, and 204 is assigned to four vertical signal lines.

Figure 5:
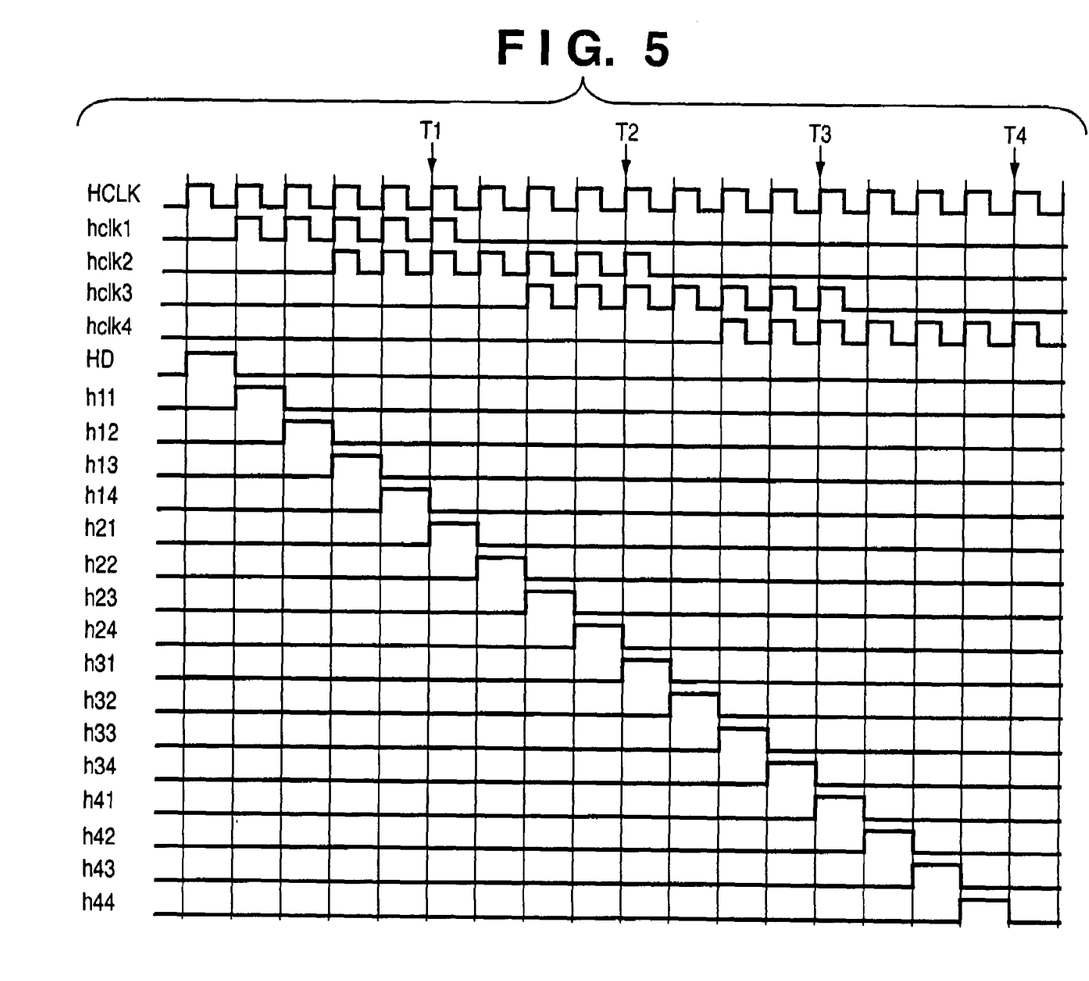
FIG. 5 is a timing chart showing the operation of the horizontal scanning circuit shown in FIG. 4.

FIG. 5 is a timing chart showing typical signals concerning the horizontal scanning circuit 150 shown in FIG. 4. The feature and operation of the horizontal scanning circuit 150 shown in FIG. 4 will be explained with reference to FIG. 5.

In the horizontal scanning circuit 150 according to the second embodiment of the present invention, each of the partial shift registers 201, 202, 203, and 204 is comprised of four registers (in this case, D flip-flops) 221. Note that the number of partial shift registers (i.e., the division number of the scanning circuit 150) and the number of stages of registers which constitute each partial shift register can be properly changed.

In the second embodiment, supply of a shift clock (e.g., hclk2) to the next partial shift regiser starts earlier by a predetermined period than timings (shift timings of shift data between partial shift registers) T1, T2, and T3 at which shift data (HD: pulses $h_{11}$ to $h_{44}$) is transferred from one partial shift register (e.g., the first partial shift register 201) to the next partial shift register (e.g., the second partial shift register 202). Supply of the shift clock to each partial shift register stops at an arbitrary timing after shift data on the final stage of a partial shift register is transferred to the next partial shift register.

The start and stop of supplying the shift clocks hclk1, hclk2, hclk3, and hclk4 to the partial shift registers 201, 202, 203, and 204 are controlled by shift clock control circuits 211, 212, 213, and 214.

More specifically, in the horizontal scanning circuit 150 shown in FIG. 4, supply of the shift clock starts earlier by two cycles of the shift clock HCLK than the timings T1, T2, and T3 for a partial shift register next to a partial shift register having shift data (high pulses $h_{11}$ to $h_{44}$). Supply of the shift clock to each partial shift register stops later by one cycle of the shift clock HCLK than the shift timings T1, T2, and T3 of shift data from the partial shift register to the next partial shift register (shift clock of one clock is supplied after T1, T2, and T3). Note that the final-stage registers of the partial shift registers 201, 202, 203, and 204 are reset by receiving a low-level signal.

When an input set signal changes to high level, the shift clock control circuit 211 is so set as to output the shift clock HCLK as the shift clock hclk1. When a column selection signal $h_{14}$ changes to high level, the shift clock control circuit 211 is so reset as to output a low-level signal by a reset signal which changes to high level upon the lapse of a predetermined period (e.g., ¾ the cycle of the shift clock HCLK) from the transition timing by a delay circuit 231. The set signal can be, e.g., the shift data HD.

When an input set signal ($h_{12}$) changes to high level, the shift clock control circuit 212 is so set as to output the shift clock HCLK as the shift clock hclk2. When a selection signal $h_{24}$ changes to high level, the shift clock control circuit 212 is so reset as to output a low-level signal by a reset signal which changes to high level upon the lapse of a predetermined period (e.g., ¾ the cycle of the shift clock HCLK) from the transition timing by a delay circuit 232.

When an input set signal ($h_{22}$) changes to high level, the shift clock control circuit 213 is so set as to output the shift clock HCLK as the shift clock hclk3. When a selection signal $h_{34}$ changes to high level, the shift clock control circuit 213 is so reset as to output a low-level signal by a reset signal which changes to high level upon the lapse of a predetermined period (e.g., ¾ the cycle of the shift clock HCLK) from the transition timing by a delay circuit 233.

When an input set signal ($h_{32}$) changes to high level, the shift clock control circuit 214 is so set as to output the shift clock HCLK as the shift clock hclk4. When a selection signal $h_{44}$ changes to high level, the shift clock control circuit 214 is so reset as to output a low-level signal by a reset signal which changes to high level upon the lapse of a predetermined period (e.g., ¾ the cycle of the shift clock HCLK) from the transition timing by a delay circuit 234.

The shift clock control circuits 211, 212, 213, and 214 can be formed from, e.g., flip-flops with set and reset terminals.

The arrangement of the horizontal scanning circuit 150 can also be applied to that of a vertical scanning circuit 160.

Third Embodiment

The third embodiment provides still another arrangement of a horizontal scanning circuit 150 in a MOS sensor 100 shown in FIG. 2. The third embodiment is different from the second embodiment in a method of generating a reset signal to be supplied to a shift clock control circuit.

Figure 6:
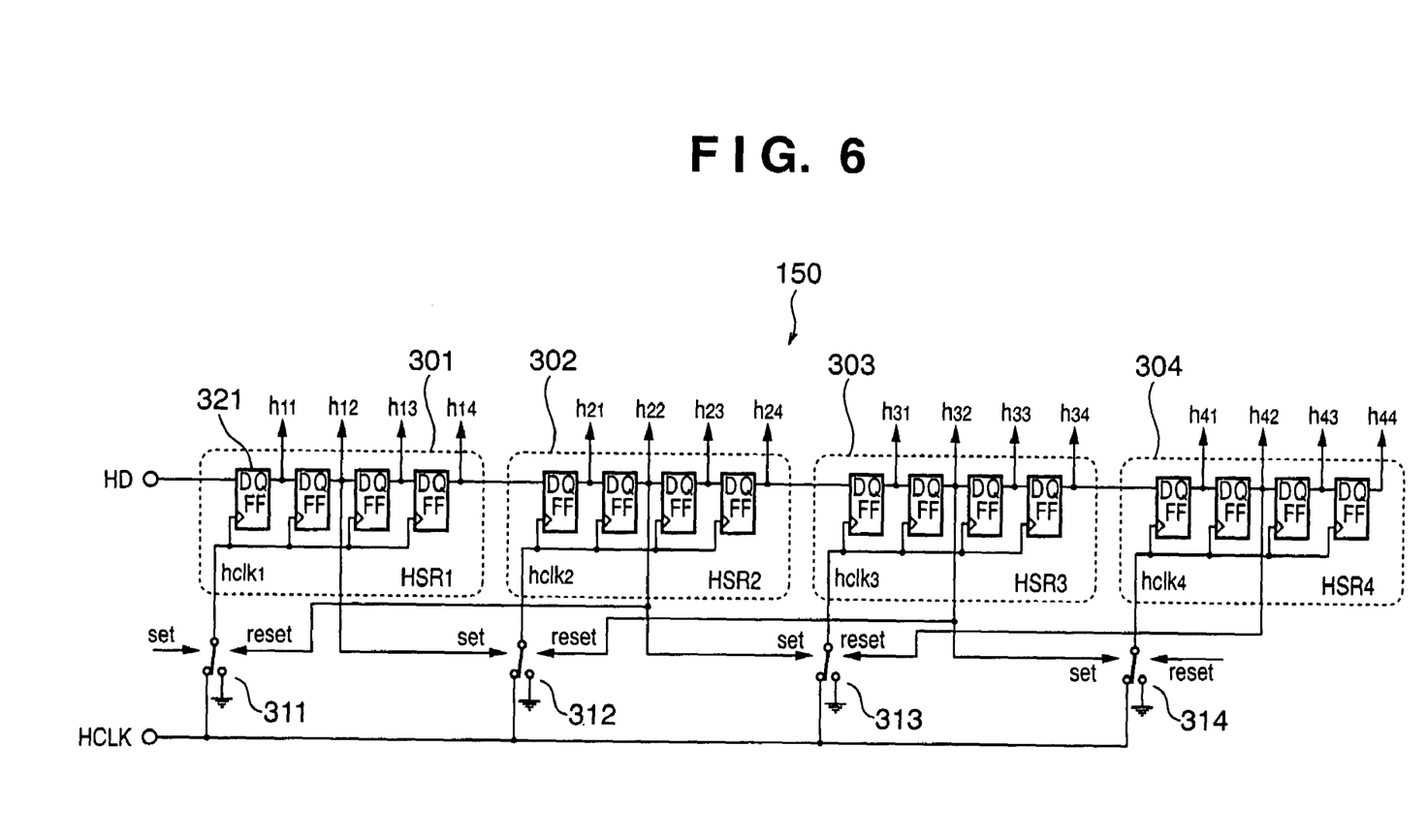
FIG. 6 is a circuit diagram showing an arrangement of a horizontal scanning circuit according to the third embodiment of the present invention.

FIG. 6 is a circuit diagram showing the arrangement of the horizontal scanning circuit 150 according to the third embodiment of the present invention. In the arrangement shown in FIG. 6, the horizontal scanning circuit 150 is divided into four partial shift registers 301, 302, 303, and 304. In the arrangement shown in FIG. 6, the total number of vertical signal lines of the MOS sensor 100 shown in FIG. 2 is 16 for illustrative convenience, and each of the partial shift registers 301, 302, 303, and 304 is assigned to four vertical signal lines.

Figure 7:
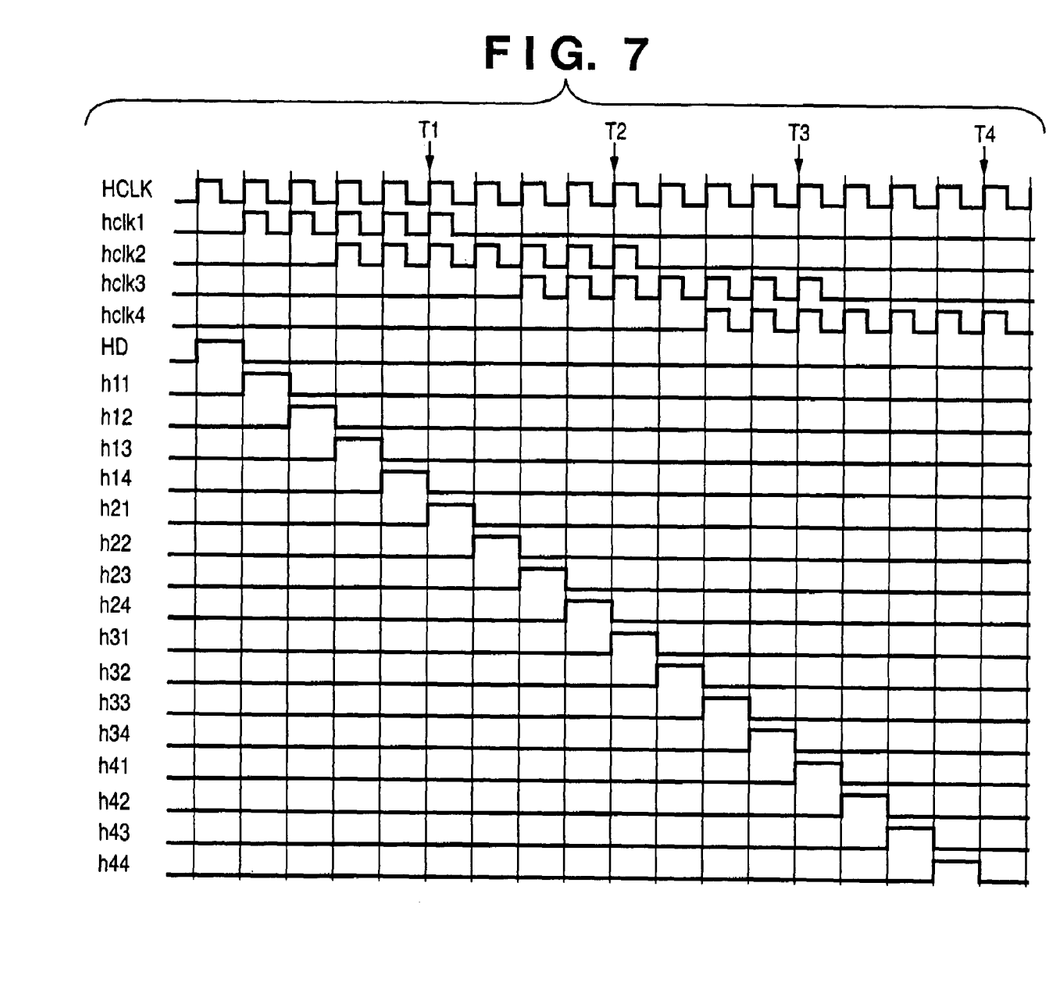
FIG. 7 is a timing chart showing the operation of the horizontal scanning circuit shown in FIG. 6.

FIG. 7 is a timing chart showing typical signals concerning the horizontal scanning circuit 150 shown in FIG. 6. The feature and operation of the horizontal scanning circuit 150 shown in FIG. 6 will be explained with reference to FIG. 7.

In the horizontal scanning circuit 150 according to the third embodiment of the present invention, each of the partial shift registers 301, 302, 303, and 304 is comprised of four registers (in this case, D flip-flops) 321. Note that the number of partial shift registers (i.e., the division number of the scanning circuit 150) and the number of stages of registers which constitute each partial shift register can be properly changed.

Also in the third embodiment, similar to the second embodiment, supply of a shift clock (e.g., hclk2) to the next partial shift regiser starts earlier by a predetermined period than timings (shift timings of shift data between partial shift registers) T1, T2, and T3 at which shift data (HD: pulses $h_{11}$ to $h_{44}$) is transferred from one partial shift register (e.g., the first partial shift register 301) to the next partial shift register (e.g., the second partial shift register 302). Supply of the shift clock to each partial shift register stops at an arbitrary timing after shift data on the final stage of a partial shift register is transferred to the next partial shift register.

The start and stop of supplying the shift clocks hclk1, hclk2, hclk3, and hclk4 to the partial shift registers 301, 302, 303, and 304 are controlled by shift clock control circuits 311, 312, 313, and 314.

More specifically, in the horizontal scanning circuit 150 shown in FIG. 6, supply of the shift clock starts earlier by two cycles of the shift clock HCLK than the timings T1, T2, and T3 for a partial shift register next to a partial shift register having shift data (high pulses $h_{11}$ to $h_{44}$). Supply of the shift clock to each partial shift register stops later by one cycle of the shift clock HCLK than the shift timings T1, T2, and T3 of shift data from the partial shift register to the next partial shift register (shift clock of one clock is supplied after T1, T2, and T3). Note that the final-stage registers of the partial shift registers 301, 302, 303, and 304 are reset by receiving a low-level signal.

When an input set signal changes to high level, the shift clock control circuit 311 is so set as to output the shift clock HCLK as the shift clock hclk1. When an input reset signal ($h_{22}$) changes to high level, the shift clock control circuit 311 is so reset as to output a low-level signal. The set signal can be, e.g., the shift data HD.

When an input set signal ($h_{12}$) changes to high level, the shift clock control circuit 312 is so set as to output the shift clock HCLK as the shift clock hclk2. When an input reset signal ($h_{32}$) changes to high level, the shift clock control circuit 312 is so reset as to output a low-level signal.

When an input set signal ($h_{22}$) changes to high level, the shift clock control circuit 313 is so set as to output the shift clock HCLK as the shift clock hclk3. When an input reset signal ($h_{42}$) changes to high level, the shift clock control circuit 313 is so reset as to output a low-level signal.

When an input set signal ($h_{32}$) changes to high level, the shift clock control circuit 314 is so set as to output the shift clock HCLK as the shift clock hclk4. When a column selection signal $h_{44}$ changes to high level, the shift clock control circuit 314 is so reset as to output a low-level signal upon the lapse of a predetermined period (e.g., ¾ the cycle of the shift clock HCLK) from the transition timing.

The shift clock control circuits 311, 312, 313, and 314 can be formed from, e.g., flip-flops with set and reset terminals.

The arrangement of the horizontal scanning circuit 150 can also be applied to that of a vertical scanning circuit 160.

[Application]

Figure 8:
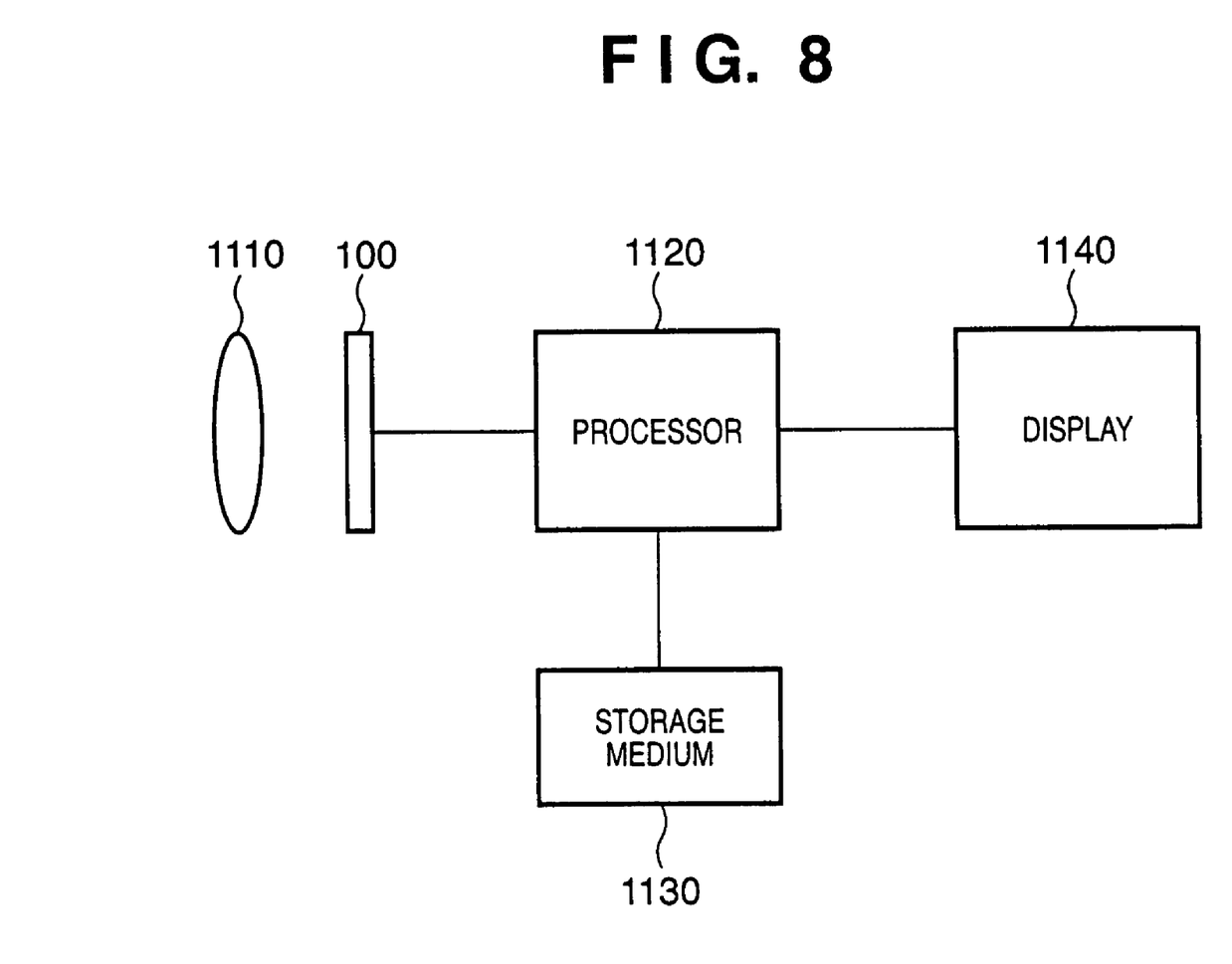
FIG. 8 is a block diagram showing an application of the image sensing apparatus according to the present invention.

FIG. 8 is a block diagram showing the schematic arrangement of a camera which incorporates the image sensing apparatus 100 shown in FIG. 2. This camera is generally called an electronic camera as a concept coordinate with a silver halide camera, and includes a still camera, a movie camera, and a hybrid camera having these functions. This camera may be assembled as part of an information processing apparatus such as a personal computer or portable terminal.

An image of an object to be sensed is formed on the image sensing apparatus 100 via a fixed or interchangeable lens unit 1110. An output from the image sensing apparatus 100 is supplied to a processor (image processor) 1120.

The processor 1120 performs image processing for a signal supplied from the image sensing apparatus 100, supplies the resultant data to a display 1140, and stores the data in a storage medium 1130. The display 1140 can function as a viewfinder and an information providing unit which displays various pieces of information concerning image sensing and reproduction.

Note that this camera typically comprises an exposure adjusting function, focusing function, and the like. These functions can be designed based on known techniques, and a detailed description thereof will be omitted.

The present invention can reduce, e.g., noise in the image sensing apparatus and/or power consumption of the image sensing apparatus.

As many apparently widely different embodiments of the present invention can be made without departing from the spirit and scope thereof, it is to be understood that the invention is not limited to the specific embodiments thereof except as defined in the claims.

What is claimed is:

1. An image sensing apparatus having a plurality of photoelectric conversion elements and a scanning circuit for reading out signals from the plurality of photoelectric conversion elements, wherein the scanning circuit comprises:
    a shift register constituted by series-connecting a plurality of partial shift registers, and
    a control circuit configured to supply, on the basis of a shift clock, a individual shift clock to each of the plurality of partial shift registers,
    wherein said shift register is configured to shift one shift data is transferred from one partial shift register to a next partial shift register and said control circuit is configured to start supply of the individual shift clock to the next partial shift register at an arbitrary timing before a timing at which the shift data is transferred from the one partial shift register to the next partial shift register.

2. The apparatus according to claim 1, wherein said control circuit operates said shift register while changing, of the plurality of partial shift registers, a partial shift register to which the individual shift clock is supplied.

3. The apparatus according to claim 1, wherein said control circuit operates said shift register while changing, of the plurality of partial shift registers, a partial shift register to which the individual shift clock is supplied, so as to shift the shift data from a first stage to final stage of said shift register.

4. The apparatus according to claim 1, wherein said control circuit stops supply of the individual shift clock to the one partial shift register at an arbitrary timing after the shift data is transferred from the one partial shift register to the next partial shift register.

5. The apparatus according to claim 1, wherein said control circuit controls supply of the individual shift clock to the plurality of partial shift registers so as to suppress, to not more than two, the number of partial shift registers to which the individual shift clock is simultaneously supplied.

6. The apparatus according to claim 1, wherein said shift register includes a horizontal shift register.

7. The apparatus according to claim 1, wherein said shift register includes a vertical shift register.

8. A camera comprising:
    an image sensing apparatus defined in claim 1; and
    a processor which processes an image sensed by said image sensing apparatus.

9. An information processing apparatus comprising:
    an image sensing apparatus defined in claim 1; and
    a processor which processes an image sensed by said image sensing apparatus.

* * * * *